United States Patent [19]

Söderkvist et al.

[11] Patent Number: 5,329,816
[45] Date of Patent: Jul. 19, 1994

[54] ELECTRODE PATTERN INTENDED FOR TUNING FORK-CONTROLLED GYRO

[75] Inventors: Jan Söderkvist, Täby; Bo Nilsson-Almqvist, Karlskoga; Tony Holm, Degerfors; Fredrik Börjesson, Stockholm, all of Sweden

[73] Assignee: Swedish Ordnance - FFV/Bofors AB, Sweden

[21] Appl. No.: 817,814

[22] Filed: Jan. 8, 1992

[30] Foreign Application Priority Data

Jan. 8, 1991 [SE] Sweden .................. 9100043-0

[51] Int. Cl.$^5$ .............................................. G01P 9/04
[52] U.S. Cl. .............................................. 73/505
[58] Field of Search ................ 73/504, 505, 510; 310/329, 370

[56] References Cited

U.S. PATENT DOCUMENTS

| | | | |
|---|---|---|---|
| 4,628,734 | 12/1986 | Watson | 73/505 |
| 4,671,112 | 6/1987 | Kimura et al. | 73/505 |
| 5,056,366 | 10/1991 | Fersht et al. | 73/505 |

FOREIGN PATENT DOCUMENTS

| | | |
|---|---|---|
| 0161049 | 11/1985 | European Pat. Off. . |
| 0298651 | 1/1989 | European Pat. Off. . |
| 60-140114 | 7/1985 | Japan . |
| 9010196 | 9/1990 | PCT Int'l Appl. . |

Primary Examiner—John E. Chapman
Assistant Examiner—Helen Kwok
Attorney, Agent, or Firm—Pollock, Vande Sande & Priddy

[57] ABSTRACT

A tuning fork-controlled gyro includes two legs and a base part, one end of each leg being connected with the base part and the legs being freely vibratable and provided with an electrode pattern comprising drive electrodes for generating a vibration in the legs of the tuning fork either in the plane of the tuning fork or out of the plane of the tuning fork and sensing electrodes for sensing vibrations occurring in the legs of the tuning fork in a plane perpendicular to the plane in which the vibration was generated. The legs and the base part are made of a single piezoelectric piece, the electrodes for driving and sensing are separated and are applied on one of the legs of the tuning fork and the sensing electrodes comprise first sensing electrodes for sensing vibrations out of the plane of the tuning fork or in the plane of the tuning fork respectively and second sensing electrodes for sensing vibrations in the plane of the tuning fork or out of the plane for regulating the in-plane or out-of-plane driving of the tuning fork.

11 Claims, 3 Drawing Sheets

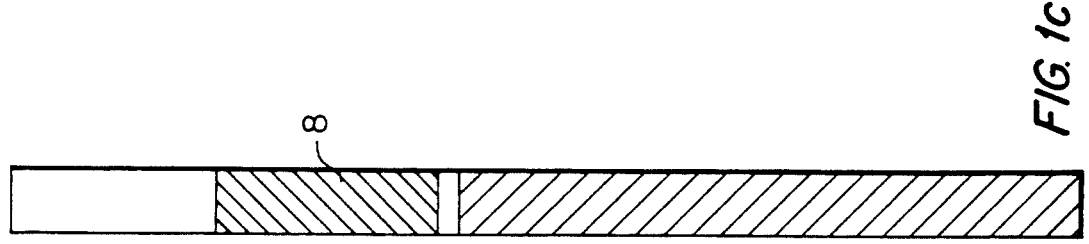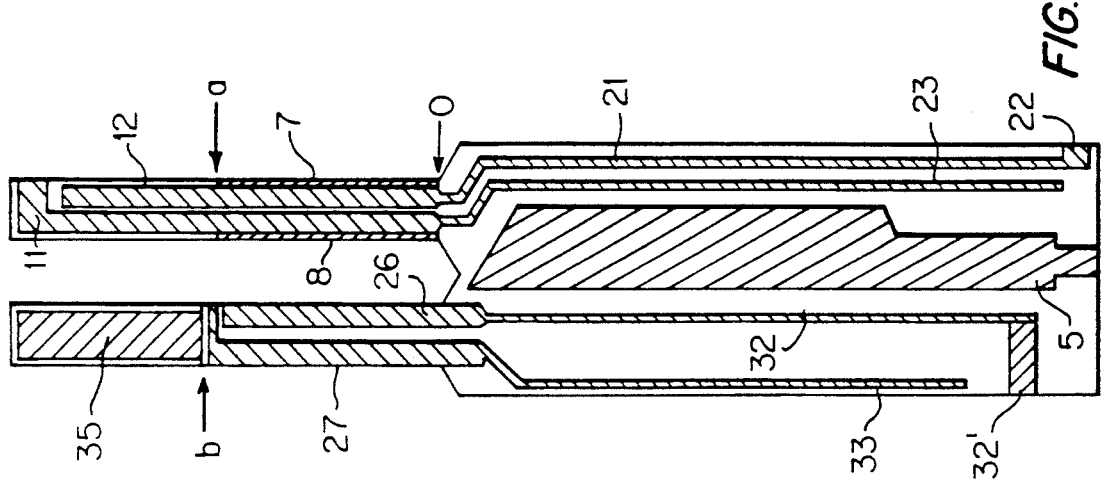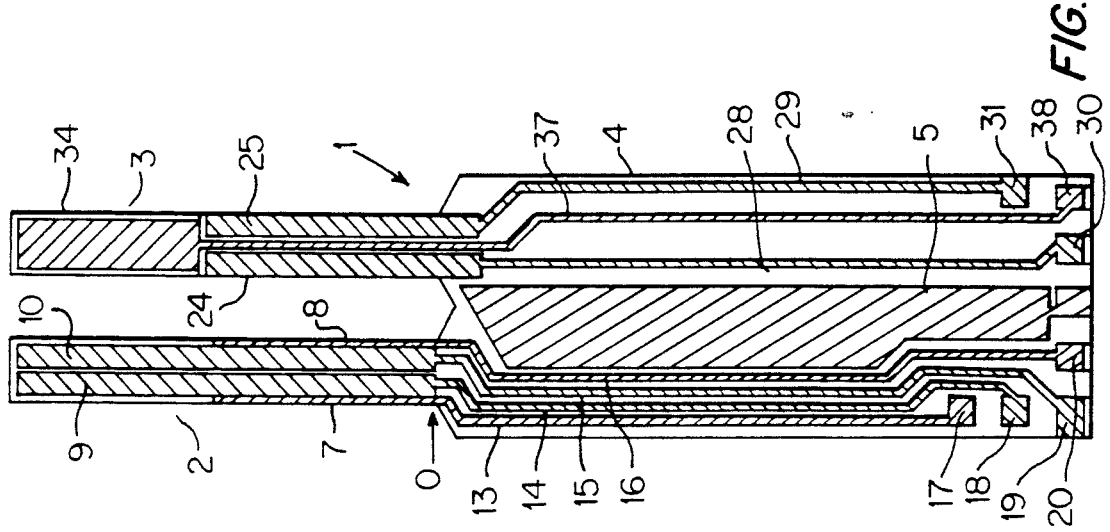

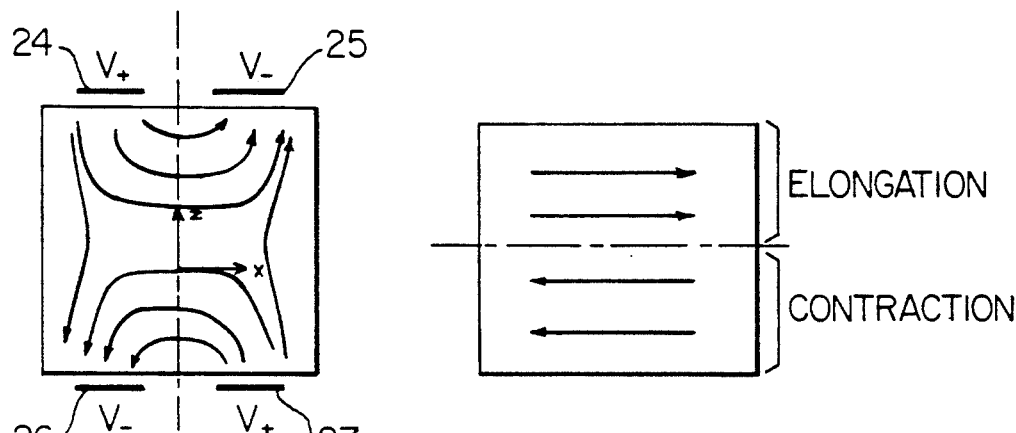
FIG. 2c
FIG. 2d
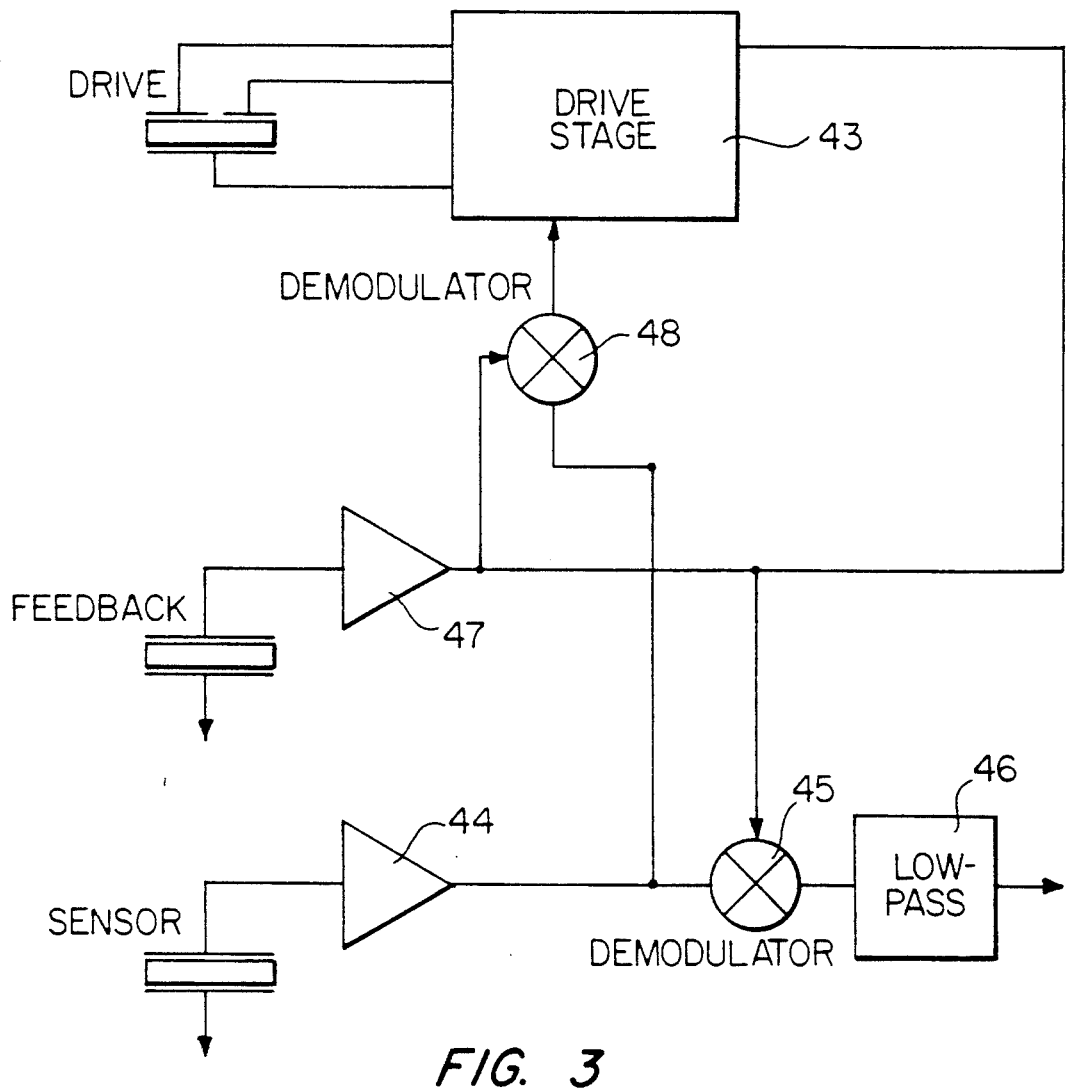
FIG. 3

ELECTRODE PATTERN INTENDED FOR TUNING FORK-CONTROLLED GYRO

TECHNICAL FIELD

The present invention relates to an electrode pattern for a tuning fork-controlled gyro constructed of a piezoelectric material, preferably quartz.

BACKGROUND ART

It is already known to utilize vibrating masses as sensor elements for the gyros. These masses have most recently been constructed from quartz, which simplifies driving and sensing since quartz is piezoelectric. This also increases the possibility for constructing a robust gyro with high G numbers since the sensor can be made small. An example of such a sensor element is described in SE 89 00 666-2.

The base of this sensor element is firmly clamped, whereas the legs of the tuning fork can freely vibrate in two planes which are at right angles with respect to one another.

A mechanical vibration is generated piezoelectrically in one plane by means of drive electrodes. Vibrations are also produced, in a plane which is at right angles to the plane in which the drive electrodes generate vibration, through Coriolis forces which act on the sensor element when it is subjected to rotation around its longitudinal axis. These vibrations produced can be piezoelectrically sensed by means of sensor electrodes.

The legs of the sensor element have a transition part in connection to its base and an attachment part, which parts are rigid and do not participate in the vibration in any significant way. The drive and sensor electrodes cover significant parts of the vibrateable ends of the legs. Since the entire sensor element is integrally constructed of a piezoelectric material, for example quartz, all the material in the legs apart from the rigid transition part and mounting part will participate in the buildup of the respective sensing of the vibrations. This provides a gyro which withstands heavy environmental stresses, especially high acceleration stresses, and which has a small external volume. Due to weak currents and relatively high interference levels, however, it has been difficult to meet the necessary requirements for drift and zero signal.

Due to imperfections in production, there will always be a certain mechanical coupling between the two directions of vibration. This leads to an output signal being present from the sensor electrodes even if the sensor is not subjected to any rotation. Such "crosstalk" is undesired since it worsens the performance of the gyro. One way of eliminating this coupling between the two directions of vibration is described in the above-mentioned which is namely to balance one of the legs in such a manner that the legs have identical vibration characteristics. This balancing can be done by attaching or removing a mass from suitably selected places on the legs. Even if balancing the masses of the legs is necessary for other reasons, it is desirable to be able to adjust the characteristics of the sensor element in another way since an adjustment of the characteristics of the sensor element by means of such masses is troublesome and increases the costs of sensor element production.

In the sensor element described in SE 89 00 666-2, both legs are utilized both for driving and sensing which implies that the two electrode sets must share the space on the legs. The electrodes must be optimized for the available space, and the sensor electrodes are preferably placed close to the transition between base and leg, while the drive electrodes are placed further out on the legs.

Such a placement of the electrodes presents problems, however, due to the fact that the weak currents which are generated on sensing can easily be affected via stray capacitances due to the high electrical voltages of the driving. It has therefore been difficult to achieve the desired drift and zero signal requirements with the type of electrode configurations described in the above patent.

There is a requirement for small inexpensive gyros which have a high G number. The disadvantages with small dimensions in a quartz sensor are, however, that very small output signals are obtained which are easily disturbed by external factors.

As the accuracy requirements increase relating to drift and zero signal, effects such as stray capacitances and unevenly etched geometry will acquire an increased negative significance. The capacitance arising between the drive electrodes, Co, also entails a drift (caused by, for example, temperature variations) since it frequently cannot be completely compensated.

SUMMARY OF THE INVENTION

The main purpose of the present invention is to propose an electrode configuration for a quartz gyro with vibrating legs which provides the possibility of a solution to the problems stated above. The solution thus provides an improvement to the sensor described in "J. Söderkvist, Design of a solid-state gyroscopic sensor made of quartz, Sensors and Actuators, A21 (1990) 293-296".

The novel sensor element is preferably constructed as a tuning fork in quartz crystal. The base of the tuning fork is firmly clamped while the legs of the tuning fork are allowed to vibrate freely. According to the present invention, both legs of the tuning fork are galvanically insulated, which involves separated electrode configurations for driving (high voltages) and sensing (low currents). The drive electrodes are constructed in such a manner that vibrations can be generated both in and out of the plane.

The sensing electrodes are divided up into feedback and sensor electrodes, the feedback electrodes registering vibration in a drive unit which can consist of vibration in the plane of the tuning fork, and the sensor electrodes register vibration at right angles to the drive vibration, which can be the gyro signal. The feedback electrodes are used for minimizing the effect of Co on the drive electronics, for permitting a constant mechanical drive amplitude, for counteracting temperature and aging in certain material parameters and for analysing a useful sensor signal. Leads can be connected to the base of the crystal, for example with the aid of bonding or TAB (Tape Automated Bonding), and by this means contact can be made with the surrounding electronics.

BRIEF DESCRIPTION OF THE DRAWINGS

An electrode pattern proposed at present which has the features significant for the invention will be described below, at the same time referring to attached drawings in which;

FIGS. 1a-1f show the electrode pattern of the tuning fork seen from different directions.

FIG. 2a–2d shows the field pattern in the piezoelectric material in a cross-section for electrode configurations used; and FIG. 3 shows a block diagram of the electronics section.

DETAILED DESCRIPTION OF THE PREFERRED EMBODIMENT

Figure 1F:
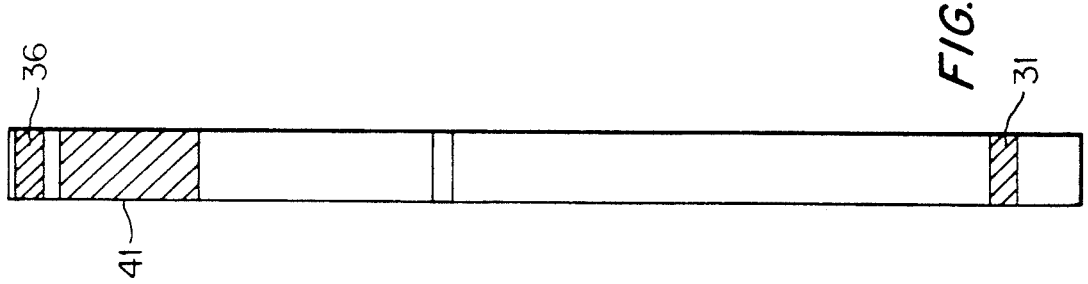
Figure 1E:
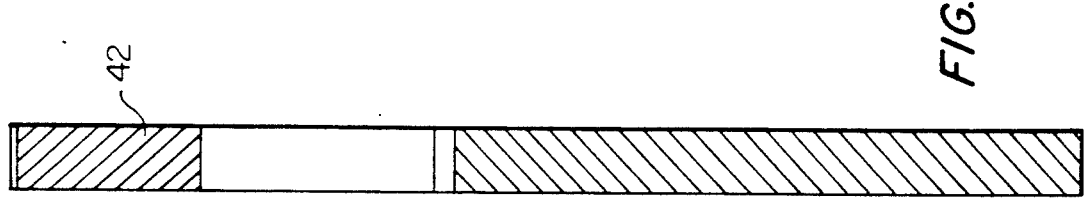
Figure 1D:
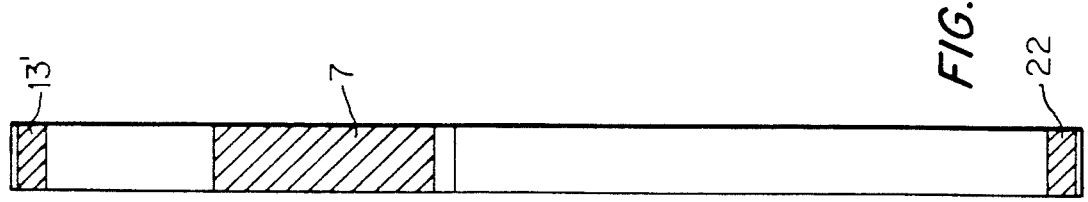

FIGS. 1a–1f show an example of the design of an electrode pattern in a sensor element 1 in the form of a tuning fork-controlled gyro. FIG. 1a shows the front of the tuning fork with two legs 2, 3 and a base part 4. The cross-sectional area of the legs is constant in this case along the entire length of the legs, which is not a functional requirement. The whole sensor element is produced from a single piezoelectric piece.

The legs of the sensor element are covered with drive electrodes for exciting a vibration of the legs, and sensing electrodes for sensing vibrations which occur both in and out of the plane. On the base 4 of the sensor element there are output pads (contact material) for permitting connection of leads for contact with the surrounding electronics. The leads can be connected with the aid of wire-bonding, TAB (Tape Automated Bonding) or the like. The electrodes, the leads which connect the electrodes to the output pads and the output pads themselves can be applied by means of known technology from quartz production.

Both legs of the tuning fork are galvanically insulated, which involves separated electrode configurations for driving and sensing. The drive electrodes thus cover the left leg 2 in FIG. 1a, while the sensing electrodes cover the right leg 3. For this to be possible, it is necessary that the base 4 participates in such a manner that the two legs are mechanically coupled to one another. The leads to the electrodes on the base part 4 are also divided into a drive side and a sensing side. Leads with high voltages (the drive side) can then be more easily kept apart from leads with weak currents, which reduces disturbances from stray capacitances. To further reduce disturbances between the drive side and the sensing side, an earth plane 5 is applied between the leads and at the same time leads with high voltages are placed as dipoles.

The left leg 2 is provided with six separate electrodes 7–12 arranged all around the sides of the leg, which can be seen in FIGS. 1a–1d. The electrodes 7 and 8 do not take up the entire length of the leg but extend from the base, marked by 0 in FIGS. 1a and 1b, to a distance a, where a is located in the range 30–60% of the length of the leg. This can be seen best in FIGS. 1c and 1d.

The electrodes on the front and back of the leg, that is the electrodes 9, 10 and, respectively, 11, 12 are divided into two and extend along the whole length of the leg.

The drive electrodes 7–12 on that part which is closest to the base of the leg, that is 0–a, form a first electrode configuration which generates a vibration of the legs in the plane of the tuning fork.

The part which is furthest out on the electrodes 9, 10 and, respectively, 11, 12 divided into two, that is in the area a–100%, forms a second electrode configuration which can be used for cancelling an unwanted vibration out of the plane. If it is not desired to cancel unwanted vibrations, the electrodes 9 and 10 and, respectively, 11 and 12 can be connected to form one electrode. The area close to the tip of the leg will then have only a function on balancing (fixing surface for applied or removed balancing material). The figures show how the electrodes 9 and 11 are connected to one another via a tongue 13', see FIG. 1d.

The drive electrodes are connected by means of conductors 13, 14, 15, 16 to four output pads 17, 18, 19, 20 for connection to external drive electronics, see FIG. 1a and 2.

The electrode 12 at the back is connected by means of a conductor 21 via a transition 22 to an output pad 19, while the electrode 11, for reasons of symmetry, has a dummy conductor 23 which extends along the base part 4.

There are two electrode configurations on the sensor leg, partly a first electrode configuration consisting of electrodes 24, 25, 26, 27 for feeding vibrations out of the plane, for example the gyro signal. The electrodes 24 and 25 are connected to one another over side parts via the electrode 42 which can be seen in FIG. 1e. The electrodes are connected at the front by means of conductors 28, 29 to output pads 30, 31 for connection to the sensor electronics. The connection 30 thus suitably has zero potential. In order to resemble the front, the electrodes 26, 27 at the back have conductors 32, 33, the conductor 33 being a dummy conductor, while the conductor 32 is connected to the output pad 31 via a transition 32'.

The first electrode configuration 24, 25, 26, 27 is placed on the part of the sensor leg 3 which is closest to the base, preferably at a distance b where b is located in the range 30–60% of the length of the leg. The sensor electrodes also extend a short way on the base part 4.

The sensor leg also comprises a second electrode configuration for feeding vibrations into the plane (drive vibrations) consisting of four electrodes 34, 35, 41, 42 placed on the external part of the leg, that is in the area b–100%. The electrodes 34 and 35 are connected to one another by means of a tongue 36, see FIG. 1f. The electrode 34 is connected by means of a conductor 37 to an output pad 38 for external electronics (for example the feedback signal).

FIG. 2 shows an example of the appearance of the electrical field pattern in a cross-section of the two legs of a tuning fork-controlled gyro. Since the theory of the piezoelectric effect in such a gyro is already known, see Jan Söderkvist, "A mathematical analysis of flexural vibrations of piezoelectric beams with applications to angular rate sensors" Acta Universitatis Uppsaliensis, 244, Uppsala 1990, the piezoelectric phenomenon will not be described in greater detail here. FIG. 2 is only intended to illustrate the appearance of the field pattern with an electrode configuration according to the present invention. For that used in the subject matter, it is obvious that other electrode configurations can also be utilized, for example that the electrodes 24–27 can also be extended on the sides of the legs.

Figure 2A:
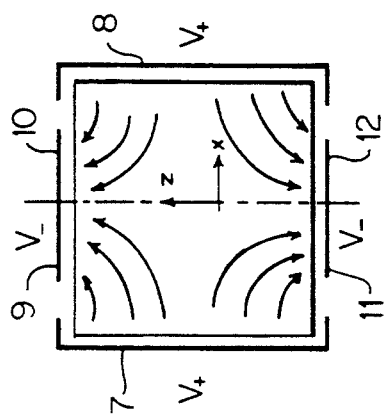
Figure 2B:
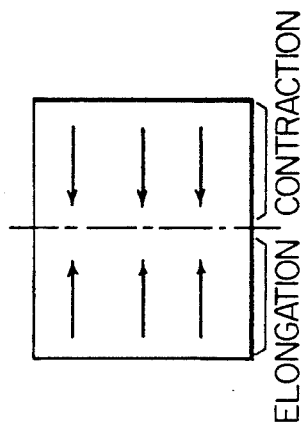

FIG. 2a shows an example of the field pattern which occurs in the piezoelectric material in the drive leg 2 when an electrical drive voltage $V_+V_-$ is applied to the drive electrodes 7–12. This field generates in this case an elongation in one part of the leg and a contraction in its other part as shown in FIG. 2b, which causes the leg to want to bend in the plane.

FIGS. 2c and 2d show a corresponding field pattern which occurs in the sensor leg 3, where the sensing electrodes 24, 25, 26 and 27 have been marked. These electrodes are utilized for sensing vibrations out of the plane of the tuning fork.

When vibration is present, the piezoelectric crystal structure will be deformed, which leads to surface and volume loads being generated. These loads, together with the electrodes, will form field patterns like those in FIG. 2a. These field patterns cause electrons to move to and from the electrodes, and a sensor current is created in this manner.

FIG. 3 shows a basic diagram of the surrounding electronics section. The drive electrodes are connected to suitable drive electronics comprising a drive stage 43, which connection generates a sinusoidal electric feed voltage for the drive electrodes.

The sensor electrodes sense a vibration at right angles to the drive vibration, among others the gyro signal, and emit a sensor signal which is supplied via the signal processing element 44, comprising known circuits such as input stage and high-pass filter, to a demodulator 45 and low-pass filter 46. The output signal from the low-pass filter represents the gyro signal.

According to the invention, the sensing electrodes also comprise a second electrode configuration, feedback electrodes, which register vibration in a drive unit and emit a feedback signal which is supplied to corresponding signal processing elements 47. The feedback signal is supplied to the demodulator 45 of the sensor section so that the phase information of the sensor signal can be fully utilized. The demodulator 48 measures the sensor current which is in phase with the feedback signal. This unwanted signal can be cancelled via the electrodes 9-12.

It is to be considered as obvious that the drive vibration does not necessarily need to occur in the plane of the tuning fork. It can just as well occur out of the plane and the sensor vibration then consists of vibration in the plane. If these vibration directions are utilized, the function of the electrodes 24-27 should be exchanged for the function of the electrodes 7-12 and, respectively, 34-35, 41-42 should be exchanged for 9-12 in the above text.

We claim:

1. A tuning fork-controlled gyro comprising:
   two legs and a base part,
   one end of each leg being connected with the base part, the legs and base part being made of a single piezo-electric piece, and the legs being freely vibratable,
   the legs being provided with an electrode pattern comprising drive electrodes for generating a vibration in the legs of the tuning fork in the plane of the tuning fork or out of the plane of the tuning fork and sensing electrodes for sensing vibrations occurring in the legs of the tuning fork in a plane perpendicular to the plane in which the vibration was generated,
   wherein the electrodes for driving and sensing are separated so that the drive electrodes are applied on one leg of the tuning fork and the sensing electrodes are applied on the other leg of the tuning fork, the sensing electrodes including first sensing electrodes for sensing vibrations out of the plane of the tuning fork or in the plane of the tuning fork respectively and second sensing electrodes (feedback electrodes) for sensing vibrations in the plane of the tuning fork or out of the plane for regulating the in-plane or out-of-plane driving of the tuning fork.

2. A tuning fork-controlled gyro according to claim 1, wherein the drive electrodes are divided into first drive electrodes for generating a vibration in the plane of the tuning fork and second drive electrodes for compensating for undesired vibration out of the plane.

3. A tuning fork-controlled gyro according to claim 2, wherein both legs of the tuning fork are galvanically insulated.

4. A tuning fork-controlled gyro according to claim 3, wherein the conductors to the electrodes on the base part of the gyro are divided into a drive side and a sensing side by a grounded electrode plane.

5. A tuning fork-controlled gyro according to claim 2, wherein the first drive electrodes are attached to the four sides of a first leg and extend from the base to a distance of 30-60% of the length of the leg, while the second drive electrodes are divided into two parts and extend along the front and back of the leg substantially along its entire length.

6. A tuning fork-controlled gyro according to claim 5, wherein the first sensing electrodes are attached to the front and back of a second leg on the part which is closest to the base.

7. A tuning fork-controlled gyro according to claim 6, wherein the first sensing electrodes extend from the base to a distance of about 30-60% of the length of the second leg.

8. A tuning fork-controlled gyro according to claim 6, wherein the first sensing electrodes also partly cover the base of the tuning fork.

9. A tuning fork-controlled gyro according to claim 6, wherein the second sensing electrodes are arranged furthest out on the second leg on its four sides.

10. A tuning fork-controlled gyro according to claim 9, wherein the second sensing electrodes extend from the tip of the second leg to the first sensing electrodes.

11. A tuning fork-controlled gyro according to claim 4, wherein the conductors to the electrodes are so arranged that a number of output pads are placed on one side of the base part of the tuning fork.

* * * * *